United States Patent
Nayberg et al.

(10) Patent No.: US 9,785,783 B2
(45) Date of Patent: Oct. 10, 2017

(54) EXECUTING PRIVILEGED CODE IN A PROCESS

(71) Applicant: CA, Inc., New York, NY (US)

(72) Inventors: Howard Israel Nayberg, Plainview, NY (US); Frederic Duminy, Lisle, IL (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/807,507

(22) Filed: Jul. 23, 2015

(65) Prior Publication Data

US 2017/0024571 A1    Jan. 26, 2017

(51) Int. Cl.
*G06F 21/60* (2013.01)
*G06F 21/62* (2013.01)
*G06F 12/02* (2006.01)

(52) U.S. Cl.
CPC .......... *G06F 21/604* (2013.01); *G06F 12/023* (2013.01); *G06F 21/629* (2013.01); *G06F 2212/1044* (2013.01); *G06F 2221/2141* (2013.01)

(58) Field of Classification Search
CPC .... G06F 21/604; G06F 12/023; G06F 21/629; G06F 2212/1044; G06F 2221/2141; G06F 221/2141
See application file for complete search history.

(56) References Cited

U.S. PATENT DOCUMENTS

| | | | | |
|---|---|---|---|---|
| 5,355,469 A * | 10/1994 | Sparks | ........... | G06F 11/366 714/38.13 |
| 5,892,944 A * | 4/1999 | Fukumoto | ........... | G06F 9/468 718/100 |
| 5,948,097 A * | 9/1999 | Glew | ........... | G06F 9/4426 711/E12.097 |
| 6,308,274 B1 * | 10/2001 | Swift | ........... | G06F 21/604 710/200 |
| 6,353,829 B1 * | 3/2002 | Koblenz | ........... | G06F 12/023 |
| 6,785,811 B1 * | 8/2004 | Bihlmeyer | ........... | G06F 21/602 380/255 |
| 7,073,059 B2 * | 7/2006 | Worely, Jr. | ........... | G06F 9/4812 713/164 |

(Continued)

*Primary Examiner* — Jung Kim
*Assistant Examiner* — James J Wilcox
(74) *Attorney, Agent, or Firm* — Fabian VanCott; Steven Nichols

(57) ABSTRACT

A system and method for executing privileged code in a process are described. The method includes establishing, by an authorized library, a privileged function. The privileged function has a first privilege level used by a processor that is executing the privileged function, while preserving a different privilege level for a process invoking the privileged function. The method includes communicating, to a computer process, access information of the privileged function, to allow the computer process to invoke the privileged function. The method includes executing the privileged function for the computer process. Executing the privileged function includes setting a processor that is being used by the computer process to use the first privilege level associated with the privileged function, executing the privileged function with that processor at the first privilege level, then restoring that processor to a previous privilege level, and returning control of that processor to the computer process.

19 Claims, 6 Drawing Sheets

(56) References Cited

U.S. PATENT DOCUMENTS

| | | | | |
|---|---|---|---|---|
| 7,509,639 B2* | 3/2009 | Worley, Jr. | G06F 9/468 | 713/164 |
| 7,631,342 B2* | 12/2009 | Focke | G06F 9/45537 | 726/1 |
| 7,930,738 B1* | 4/2011 | Petersen | G06F 21/52 | 713/190 |
| 8,090,943 B1* | 1/2012 | Tran | G06F 9/44521 | 707/781 |
| 8,863,232 B1* | 10/2014 | Tidd | G06F 17/30165 | 713/151 |
| 2003/0033537 A1* | 2/2003 | Fujimoto | G06F 21/123 | 713/193 |
| 2003/0115476 A1* | 6/2003 | McKee | G06F 9/52 | 713/193 |
| 2005/0097252 A1* | 5/2005 | Kelley | G06F 9/468 | 710/200 |
| 2005/0283826 A1* | 12/2005 | Tahan | G06F 21/606 | 726/2 |
| 2006/0047958 A1* | 3/2006 | Morais | G06F 21/51 | 713/166 |
| 2008/0168258 A1* | 7/2008 | Armstrong | G06F 9/30101 | 712/43 |
| 2009/0063835 A1* | 3/2009 | Yao | G06F 12/1491 | 713/2 |
| 2010/0281260 A1* | 11/2010 | Farrugia | H04L 9/3236 | 713/170 |
| 2011/0030036 A1* | 2/2011 | Wells, Jr. | G06F 21/6281 | 726/4 |
| 2012/0117625 A1* | 5/2012 | Ray | H04L 9/3247 | 726/4 |
| 2012/0131635 A1* | 5/2012 | Huapaya | H04L 9/088 | 726/1 |
| 2013/0024929 A1* | 1/2013 | Abraham | G06F 21/53 | 726/16 |
| 2013/0086581 A1* | 4/2013 | Frazier | G06F 9/462 | 718/1 |
| 2013/0185720 A1* | 7/2013 | Tuch | G06F 12/023 | 718/1 |
| 2014/0351930 A1* | 11/2014 | Sun | H04L 63/1441 | 726/22 |
| 2015/0156202 A1* | 6/2015 | Clark | H04L 63/10 | 726/4 |
| 2015/0331809 A1* | 11/2015 | Satyavolu | G06F 9/4401 | 711/104 |
| 2016/0188251 A1* | 6/2016 | Dunning | G06F 12/1009 | 711/165 |

* cited by examiner

EXECUTING PRIVILEGED CODE IN A PROCESS

BACKGROUND

A computer may execute computer program code sets as processes in a computing environment. Each process is associated with a number of privileges. The privileges allow each process to access certain data. A computer may prevent processes from accessing certain data when the processes do not have privileges to access the data.

BRIEF SUMMARY

In one example, a method is implemented for executing privileged code in a process. According to the method, a first process establishes a privileged function. The privileged function has a first privilege level used by a processor that is executing the privileged function, while preserving a different privilege level for a process invoking the privileged function. According to the method, access information of the privileged function is communicated to a computer process to allow the computer process to invoke the privileged function. According to the method, the privileged function is executed for the computer process. The privileged function sets a processor that is being used by the computer process to use the first privilege level associated with the privileged function, executes the privileged function with that processor at the first privilege level, then restores that processor to a previous privilege level, and returns control of that processor to the computer process.

In another example, a system for granting privileged access to computer code is described. The system includes a processor, memory communicatively coupled to the processor, and a privilege system. The privilege system includes an establish engine. The establish engine establishes, by an authorized library, a privileged function stored in a block of memory. The privileged function has a first privilege level used by a processor that executes the privileged function while preserving a different privilege level for a process invoking the privileged function. The privilege system includes a communicate engine. The communicate engine communicates, to a computer process, a location of the block of memory storing the privileged function so as to allow the computer process to invoke the privileged function. The privilege system includes an execute engine. The execute engine executes the privileged function for the computer process. The execute engine sets a processor controlled by the computer process to use the first privilege level associated with the privileged function, executes the privileged function with that processor at the first privilege level, restores that processor to a previous privilege level, and returns control of that processor to the computer process.

In still another example, a computer program product for granting privileged access to computer code is described. The computer program product includes a non-transitory machine-readable storage medium having program instructions embodied therewith. The program instructions are executable by a processor to cause the processor to establish, by an authorized library, a privileged function stored in a block of memory. The privileged function has a first privilege level used while executing the privileged function, while preserving a different privilege level for a process invoking the privileged function. The program instructions are executable by a processor to cause the processor to communicate, to a computer process, a location of the block of memory storing the privileged function to allow the computer process to invoke the privileged function. The program instructions are executable by a processor to cause the processor to execute the privileged function for the computer process. Executing the privileged function includes setting a processor that is being used by the computer process to use the first privilege level, executing the privileged function with that processor at the first privilege level, restoring that processor to a previous privilege level, and returning control of that processor to the computer process.

BRIEF DESCRIPTION OF THE DRAWINGS

Aspects of the present disclosure are illustrated in the accompanying drawings by way of example. The accompanying drawings do not limit the scope of the claims.

Throughout the drawings, identical reference numbers designate similar, but not necessarily identical, elements.

DETAILED DESCRIPTION

Figure 1:
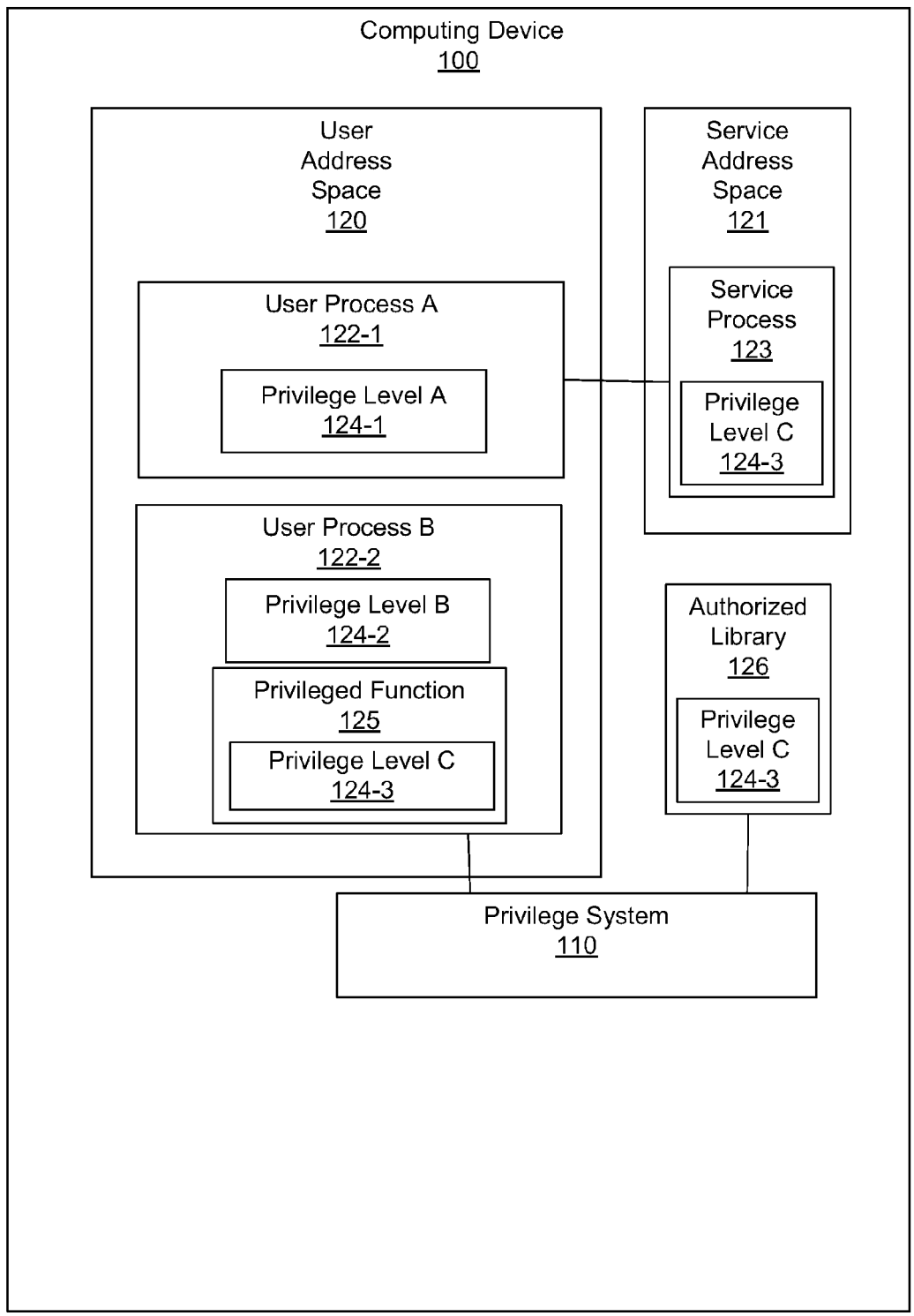
FIG. 1 is a diagram of a computing device granting privileged access to computer code, according to one example of principles described herein.

The present specification describes a method, system, and computer program product for granting privileged access to computer code, such that a privileged function executes for a calling process while preserving the address space and privilege level of the calling process.

The subject matter described herein may be a system, a method, and/or a computer program product. The computer program product may include a computer readable storage medium (or media) having computer readable program instructions thereon for causing a processor to carry out aspects of the subject matter described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but is not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment, or offered as a service such as a Software as a Service (SaaS).

Aspects of the present disclosure are described herein with reference to flowchart illustrations and/or block diagrams of methods, apparatuses (systems) and computer program products according to examples of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, can direct a computer, other programmable data processing apparatus, or other devices to function in a particular manner, such that the instructions, when stored in the computer readable medium, produce an article of manufacture including instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular aspects and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function, in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

As noted above, a computer may provide data access to a set of processes with different privilege levels. The computer may prevent a process from accessing certain data when the process does not have privileges to access that data. A process that does not have privileges to access needed data may request that a different process that does have privileges to the data access the data and communicate the value to the process that lacks elevated privileges. Similarly, a computer may provide access to a privileged code set. The privileges of the privileged code set allow that code set to, when executed by a processor, perform operations that other code is not allowed to perform.

The computer may execute a privileged process in a designated service access address space. The designated service access address space provides the process using the designated service access address space with additional privileges. Typically, the service access address space provides only a limited address space. The limited size of this address space limits the number of processes able to use the designated service address space. At times, the designated service address space may not be available. When the designated service address space is not available, processes are not able to access certain data or code that uses the privileges associated with the designated service address space. Accessing data through the designated service address space causes the system to keep the designated service address space available. Keeping the designated service address space available consumes system resources and may have negative effects on the system.

The principles described herein include a system and method for controlling access to data, for example, data affecting a computer system. Such a method includes establishing, by an authorized library, a privileged function, the privileged function having a first privilege level used by a processor that is executing the privileged function, while preserving a different privilege level for a process invoking the privileged function. The method includes communicating, to a computer process, access information for the privileged function, to allow the computer process to invoke the privileged function. The method includes executing the privileged function for the computer process.

Executing the privileged function includes setting the processor that is being used by the computer process to use the first privilege level associated with the privileged function, executing the privileged function with that processor at the first privilege level, then restoring that processor to a previous privilege level, and returning control of that processor to the computer process that called the privileged function. The method provides access to privileged data, and privileged code allows the system to operate without the availability of a service address space. Further, the method provides access to privileged data and privileged code without modifying the address space from the perspective of the process invoking the privileged function. Code in the calling process without an elevated privilege level may run as though the privileged code is not present. The privileged code changes the permissions associated with the process invoking the privileged function. The elevated privileges are used by invoking the privileged function through an interface to the privileged function. The elevated privileges may not be used without using the interface to the privileged function. The privileges associated with the process are otherwise unchanged. Further, the memory storing the privileged function may then be released as part of the termination of the process.

As used in the present specification and in the appended claims, the term "a number of" or similar language may include any positive number, including one to infinity; zero not being a number, but the absence of a number.

Further, as used in the present specification and in the appended claims, the term "privilege" refers to a special right or advantage granted to a processor executing computer code to perform specific operations, such as to access certain data, execute certain computer code, or execute specific instructions on a processor. For example, a process that has a privilege to access a data file is able to view the data in the file, whereas a process that does not have that privilege cannot view the data in the data file.

Still further, as used in the present specification and in the appended claims, the term "privileged function" refers to a set of computer code that, when executed on a processor, performs an operation, wherein the operation performed may not be performed by some other set of computer code executing on the processor.

Still further, as used in the present specification and in the appended claims, the term "computer process" refers to a set of computer code that, when executed by a processor, performs a number of tasks. A process includes a number of data structures that assist in the execution of the code associated with the process. The number of data structures include an address space and a number of file descriptors.

Still further, as used in the present specification and in the appended claims, the term "privileged process" refers to a set of computer code that, when executed by a processor, performs a number of tasks that use elevated privileges.

Still further, as used in the present specification and in the appended claims, the term "service address space" refers to a set of resources to allow computer program code to be executed with elevated privileges. A service address space is a resource for a system to allow privileged code to execute. A service address space may include a reserved memory range. A service address space may include reserved memory and processing resources. A service address space may be implemented as a hardware component to provide elevated privilege access to code executing on a computing device. A service address space may be implemented as a software resource to provide elevated privilege access to executing code on a computing device.

Still further, as used in the present specification and in the appended claims, the term "authorized library" refers to a set of computer program code authorized to execute with elevated privileges. The execution of code in an authorized library establishes resources for the execution of a new process. An authorized library consolidates computer program code to perform tasks for other computer program code. An authorized library may be implemented as a set of computer program code referenced by a different set of computer program code. An authorized library may be implemented as a set of compiled computer code or as a service offered by a computer process. A computer process implementing an authorized library may run as part of the normal operation on a computing device or may run using a service address space.

Still further, as used in the present specification and in the appended claims, the term "privilege level" refers to a set of privileges that computer code, executing on a processor, may use. A first set of privileges that is different from a second set of privileges allows access computer program code using the first set of privileges to access data or execute code that the second set of privileges is not able to access or execute. The two sets of privileges have different privilege levels.

Still further, as used in the present specification and in the appended claims, the term "elevated privileges" refers to a set of privileges that includes the original privileges and a set of additional privileges. A set of computer code executing on a processor may use elevated privileges to perform a specific operation. A set of computer code executing on a processor may use elevated privileges compared to other computer code executing on the processor.

Still further, as used in the present specification and in the appended claims, the term "access privilege level" refers to a set of privileges that allows a set of computer code executing on a processor to access functions or data that are reserved for computer code that, when executing on the processor, has designated privileges. Privileges may be granted by other resources that grant privileges, such as an access control system.

Still further, as used in the present specification and in the appended claims, the term "preserve" means to maintain in the original or existing state. Preserving a process privilege level causes the process to maintain its current privilege level.

Still further, as used in the present specification and in the appended claims, the term "call" refers to when a first set of computer code, executing on a processor, invokes a second set of computer code. The second set of code then executes on the processor. The first set of computer code is the caller. The process of invoking the second set of computer code is referred to as calling the second set of computer code.

Still further, as used in the present specification and in the appended claims, the term "control" refers to the power or influence over a processor attributed to a set of computer code executing on the processor. A set of code that has control of the processor is the set of code that is executing on the processor.

Still further, as used in the present specification and in the appended claims, the term "block of memory" refers to a segment of memory used to store data and/or computer program code. A block of memory may be physically sequential memory. A block of memory may be represented as sequential through an abstraction layer of the memory address. A block of memory may contain a number of blocks of memory.

Still further, as used in the present specification and in the appended claims, the term "address space" refers to a range of either physical or virtual memory accessible to a processor or reserved for a process. Allowing each process to have a unique address space may prevent processes from interfering with each other.

Still further, as used in the present specification and in the appended claims, the term "termination" refers to when a set of computer code indicates to a processor that the set of computer code will no longer execute on the processor and the resources allocated to that set of computer code are released. Termination of a set of computer code occurs, for example, when a process, thread, or function exits.

Even further, as used in the present specification and in the appended claims, the term "token" refers to a sequence of bits passed between a first set of code executing on a processor and a second set of code executing on a processor. A token indicates to the second set of code executing on a processor, information communicated from the first set of code executing on a processor.

Referring now to the figures, FIG. 1 is a diagram of a computing device (100) granting privileged access to computer code, according to one example of principles described herein. The computing device includes a user address space (120) and a service address space (121). Processes (122) using the user address space (120) have a privilege level (124-1, 124-2). Processes (123) using the service address space (121) have privilege level C (124-3). Privilege level C (124-3) is an elevated privilege level associated with the service address space (121). A process (122) that executes, on a processor, computer program code at privilege level C (124-3) is a privileged process.

The user address space (120) comprises a set of data and privileges used to grant access to data and code to a process using the user address space. The set of data and privileges may be shared by a number of processes (122) using the user address space (120). Additional restrictions on access to data may prevent one process from accessing data associated with a different process using the user address space (120). For example, user process A (122-1) may be prevented from accessing data associated with user process B (122-2). A number of privilege levels may be associated with processes using the user address space (120). For example, user process A (122-1) is associated with privilege level A (124-1). User process B (122-2) is associated with privilege level B (124-2). User process A (122-1) and user process B (122-2) are prevented from accessing the same data because they have different privilege levels.

The service address space (121) is associated with a set of data and privileges used to grant access to data and code to a process using the service address space. The privileges associated with the service address space (121) may, for example, be privileges associated with a computer operating system. A process using the service address space (121) may perform tasks on behalf of processes (122) not using the service address space. A process (123) using the service address space (121) may perform a task based on a request received. A process with privileges using the service address space (121) may change the privileges associated with the process to accomplish various tasks.

A process using the user address space (120) may access data associated with a service address space (121) through a number of mechanisms. In one example, user process A (122-1) communicates to a service process (123). The service process (123) is associated with privilege level C (124-3). The service process (123) executes privileged code on behalf of user process A (122-1), and communicates the results to user process A (122-1). In another example, an authorized library (126) is associated with privilege level C (124-3). The authorized library (126) is a set of computer program code authorized to execute with elevated privileges while creating a new process. The execution of code in the authorized library establishes resources, such as memory and an address space, for the execution of the new process. The authorized library is implemented as a set of computer program code referenced by a different set of computer program code. In one example, the authorized library executes to establish user process B (122-2). The authorized library (126) communicates with the privilege system (110) to enable user process B (122-2) to execute a privileged function (125) associated with privilege level C (124-3). The authorized library (126) uses the privilege system (110) to establish the privileged function (125) associated with privilege level C (124-3). The privileged function (125), when executed by a processor, preserves a different privilege level (124) of a process invoking the privileged function (125). The privilege system (110) communicates, to user process B (122-2), access information of the privileged function (125), to allow user process B (122-2) to invoke the privileged function. The privileged function (125), when executed on a processor for user process B (122-2), sets a processor to use privilege level C (124-3), executes the privileged function (125), and then restores that processor to use privilege level B (124-2).

The privilege system (110) allows user process B (122-2) to use privilege level C (124-3) without accessing the service address space (121). User process B (122-2) may access data or code using privilege level C (124-3) without communicating with a process using the service address space (121). The privilege system (110) allows access to privilege level C (124-3) without accessing the service address space (121). Further, the computing device (100) may have a number of privileged functions (125) that are established at different times. When the service address space (121) is used, a change in access to privileged data affects processes accessing the privileged data. By associating a privileged function (125) with each process, each process using the privileged function (125) may operate independently. Each process may be stopped, terminated, or started without interaction with other processes. Each process operating independently allows each process to be updated individually, rather than affecting all processes on the computing device (100) at the same time.

Figure 2:
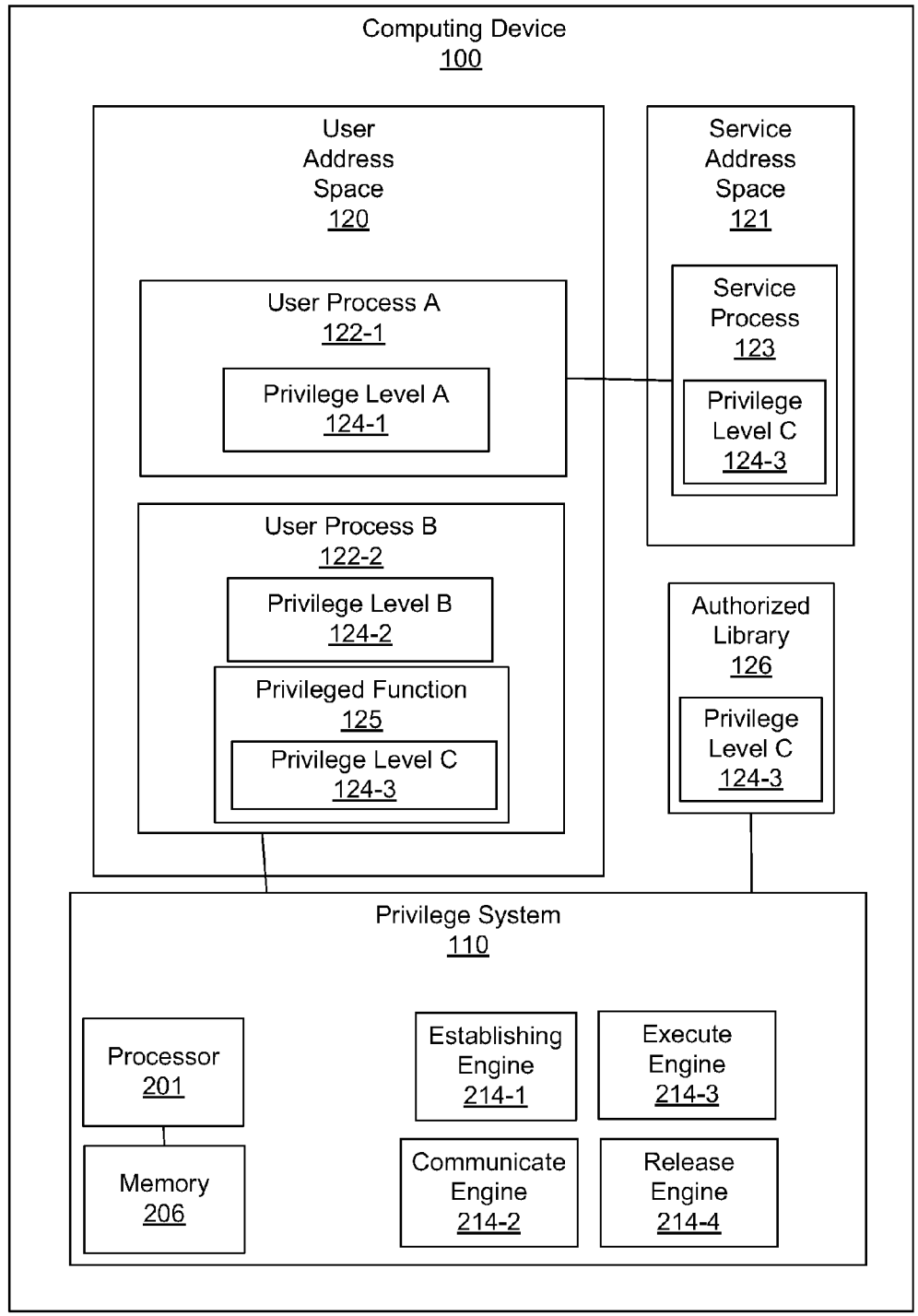
FIG. 2 is a diagram of a computer device granting privileged access to computer code, according to one example of principles described herein.

FIG. 2 is a diagram of a computing device (100) granting privileged access to computer code, according to one example of principles described herein. As illustrated in FIG. 1, the computing device (100) includes a user address space (120) and a service address space (121). Processes (122) using the user address space (120) use a number of privilege levels (124-1, 124-2). Processes (123) using the service address space (121) use an elevated privilege level. Privilege level C (124-3) is an elevated privilege level associated with the service address space (121). In one example, a process (122) that executes, on a processor, computer program code at privilege level C (124-3), is a privileged process. Examples of a computing device (100) include servers, desktop computers, laptop computers, personal digital assistants (PDA), mobile devices, smartphones, gaming systems, and tablets, among other electronic devices.

The computing device (100) may be utilized in a data-processing scenario. The computing device (100) may include stand-alone hardware, mobile applications, a computing network, or combinations thereof. Further, the computing device (100) may be used in a computing network, a public cloud network, a private cloud network, a hybrid cloud network, other forms of networks, or combinations thereof. In one example, the methods provided by the computing device (100) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; an application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (100) are executed by a local administrator.

To achieve its desired functionality, the computing device (100) may include various hardware components. Among these hardware components may be a number of processors (201), a privilege system (110), a number of peripheral adapters, and a number of network adapters. These hardware components may be interconnected through the use of a number of buses and/or network connections. In one example, the processor (201), privilege system (110), peripheral device adapters, and network adapter may be communicatively coupled via a bus.

The computing device (100) may include various types of memory modules, including volatile and nonvolatile memory. For example, the transferring system (119) may include Random Access Memory (RAM), Read Only Memory (ROM), and Hard Disk Drive (HDD) memory. Many other types of memory may also be utilized, and the present specification contemplates the use of as many varying type(s) of memory in the computing device (100) as may suit a particular application of the principles described herein. In other examples, different types of memory in the computing device (100) may be used for different data storage needs. In some examples, the processor (201) may boot from Read Only Memory (ROM), maintain nonvolatile storage in the Hard Disk Drive (HDD) memory, and execute program code stored in Random Access Memory (RAM).

Hardware adapters in the computing device (100) enable the processor (201) to interface with various other hardware elements, external and internal to the computing device (100). Peripheral device adapters may provide an interface to input/output devices, such as a display device, a mouse, or a keyboard. Peripheral device adapters may also provide access to other external devices, such as an external storage device, a number of network devices, such as servers, switches, and routers, client devices, other types of computing devices, or combinations thereof.

A display device may be provided to allow a user of the computing device (100) to interact with and implement the functionality of the computing device (100). Peripheral device adapters may also create an interface between the processor (201) and the display device, a printer, or other media output devices. Network adapters may provide an interface to other computing devices within, for example, a network, thereby enabling the transmission of data between the computing device (100) and other devices located within the network.

The privilege system (110) may include a number of engines used in the implementation of the support for granting access to privileged code. The various engines within the computing device (100) comprise executable program code that may be executed separately. The various engines may be stored as separate computer program products. The various modules within the computing device (100) may be combined within a number of computer program products, each computer program product comprising a number of the engines.

The privilege system (110) may be implemented on a computing device (100) associated with both the user address space (120) and the system address space (122). A process associated with the user address space (120) may communicate with a process associated with a service address space (123) using an inter-process communication protocol. In one example, the user address space (120) is hosted on a first computing device and the service address space (121) is hosted on a second computing device. A process using the user address space (120) communicates with a process using the service address space (121) using a communication protocol, such as a network protocol.

As described above, an authorized library (126) uses the privilege system (110) to establish a privileged function (125) in a process. The privileged function (125), when executed by a processor, performs a privileged task. The privilege system (110) communicates access information of the privileged function (125) to the process to allow the process to invoke the privileged function. The privilege system (110) executes the privilege function (125) for the process. The privileged function (125), when executed on a processor, sets a processor to an elevated privilege level, executes the privileged function (125), and then restores that processor to a different privilege level. In one example, the authorized library (126) communicates with the privilege system (110) to enable user process B (122-2) to access privileged data. The privilege system (110) establishes a privileged function (125) associated with privilege level C (124-3) in memory associated with user process B (122-2). The privilege system (110) communicates the interface of the privileged function (125) to user process B (122-2). User process B (122-2) invokes the privileged function (125) to access privileged data. The privileged function (125) sets the processor to use privilege level C (124-3) and access the data, then restores the processor to a different privilege level. The privilege level of user process B (122-2) is preserved.

The privilege system (110) includes an establishing engine (214-1) to establish, by an authorized library, a privileged function. The privileged function may be stored in a block of memory associated with a process. The privileged function has a first privilege level, used by a processor that executes the privileged function, while preserving a different privilege level for a process invoking the privileged function. The establishing engine (214-1) may allocate a block of memory to store the privileged function. The block of memory may be in the user address space (120). The block of memory may be associated with a user process (122) using the user address space (120). The block of memory may be part of an address space for a user process (122). In one example, a service process (123) allocates a block of memory in an address space of a user process (122) for a privileged function (125). The service process (123) assigns computer program code to the block of memory to establish the privileged function (125). The user process (122) non-privileged code is able to access the block of memory and execute the privileged function (125) when the non-privileged code uses the interface provided to the privileged function. The block of memory that stores the privileged function (125) may be added to an address space associated with a computer process. The address space for the associated process appears, from the perspective of the code in the process, not to be modified.

For example, a caller using an authorized library may use the program call instruction of the International Business Machines (IBM) z/Architecture. The program call instruction uses a series of arguments to determine that a caller of the program call instruction is allowed to use an elevated privilege level. A caller has a first privilege level when the caller uses the program call instruction. The program call instruction changes the privileges of the caller to a second privilege level. The caller executes a number of instructions at the second privilege level. The caller then uses the program return instruction to restore the first privilege level.

Similarly, the privileged function (125) may use similar instructions reserved for processes that have privileges associated with the authorized library (126). The instructions provide use of an elevated privilege level for the function and may rely on the function to restore the privilege level. The instructions in the privileged function may be established by a process that has access to the service address space (121). The instructions allow access to data as if the function were in the authorized library (126). When executed, the privileged function maintains the privilege levels of the calling process. The privileged function (125) is trusted by the operating system as if the privileged function were the authorized library (126). For example, a computer architecture may use a key to access memory, such as data or instructions. The computer architecture may, for example, use a key to indicate that an instruction may be executed. The key may be added as part of the instruction, or may be used as a part of a value referenced by the instruction.

The privilege system (110) includes a communicate engine (214-2) to communicate, to a computer process, a location of the block of memory storing the privileged function, so as to allow the computer process to invoke the privileged function. The information may be communicated to the computer process as an argument to a process creation action. For example, the location of the privileged function may be passed as part of an exec call. An exec call is an operating system interface to execute an executable program. Information may be provided to the exec call to inform the process of the location of the privileged function (125). The access information for the privileged function (125) may include a program counter index and a program entry point. In one example, the privilege system (110) communicates a token to the computer process. The computer process uses a system utility to associate the token with additional information, so that the computer process may invoke the function. The computing device (100) may offer a utility, such as the PC-Non-Switch LX/EX routine, to associate a token with a reference to a function.

The privilege system (110) includes an execute system (214-4) to execute the privileged function for the computer process. Executing the privileged function (125) includes setting a processor controlled by the computer process to use the first privilege level associated with the privileged function, executing the privileged function with that processor at the first privilege level, restoring that processor to a previous privilege level, and returning control of that processor to the computer process that called the privileged function. The processor is set to use the first privilege level without changing the privilege level associated with the computer process. In this way, the privileged function (125) has access to data and code associated with the first privilege level, but the remainder of the computer process may not be able to exploit use of the first privilege level. A privilege level may be represented by a single bit. A privilege level may be represented by a series of data, such as bits, indicating information about the privilege level or identifying the privilege level. A number of bits may be associated within the bits to identify access control within a privilege level.

The privilege system (110) may include a release engine (214-5) to release, as part of termination of the computer process, the block of memory. The release engine (214-5) may be invoked as part of the termination of the process. In one example, a release engine (214-5) is called as part of the termination of a process to release the block of memory associated with the privileged function. In another example, the functionality of the release engine (214-5) is implemented as part of an operating system. The operating system releases the memory associated with the privileged function (125) as part of the termination of the computer process.

A specific example according to FIG. 2 will now be described. In this example, an authorized library (126) uses the privilege system (110) to establish a privileged function (125). The authorized library (126) is associated with privilege level C (124-3). The authorized library (126) provides access to a privileged function (125) associated with privilege level C (124-3) to user process B (122-2)

The authorized library (126) establishes, with the establishing engine (214-1), a privileged function. The privileged function (125) is associated with privilege level C (124-3) used by the processor (201). The privileged function (125) preserves a different privilege level for a process invoking the privileged function. In this example, the privileged function (125) is allocated as part of user process B (122-2). The privileged function (125) uses a set of privileged instructions to execute computer code with privileges associated with privilege level C (124-3) while preserving user process B (122-2) at privilege level B (124-2).

The authorized library (126) communicates, with the communicate engine (214-2) the location of the privileged function (125) associated with privilege level C (124-3). In this example, the authorized library (126) causes a computer operating system to create user process B (122-2). The authorized library (126) passes a 32-bit token as part of the process creation. User process B (122-2) receives the 32-bit token and uses a PC-Non-Switch LX/EX routine to identify the location of the privileged function (125) based on the 32-bit token. User process B (122-2) is associated with privilege level B (124-2). User process B (122-2) uses the privileged function (125) to access needed data associated with privilege level C (124-3).

When user process B (122-2) executes the privileged function (125) using the executing engine (214-3) user process B is executing on the processor (201) using privilege level B (125). The privilege system (110) causes the privileged function (125) to be executed by the processor (201). The privileged function (125) preserves privilege level B (124-2), associated with process B (122-2), by maintaining the privilege level associated with user process B (122-2). The privileged function (125) uses privileges that are associated with instructions, leaving the privileges associated with user process B (122-2) undisturbed. The privileged function (125) executes a number of instructions associated with privilege level C (124-3). Privilege level C (124-3) allows access to data associated with the privilege level C (124-3). The privileged function (125) restores privilege level B (124-2) by returning from the privileged function and no longer executing the privileged instructions.

The release engine (214-4) releases the privileged function (125) when user process B (122-2) exits. The release engine (214-4) causes the operating system to release the memory associated with the privileged function.

Figure 3A:
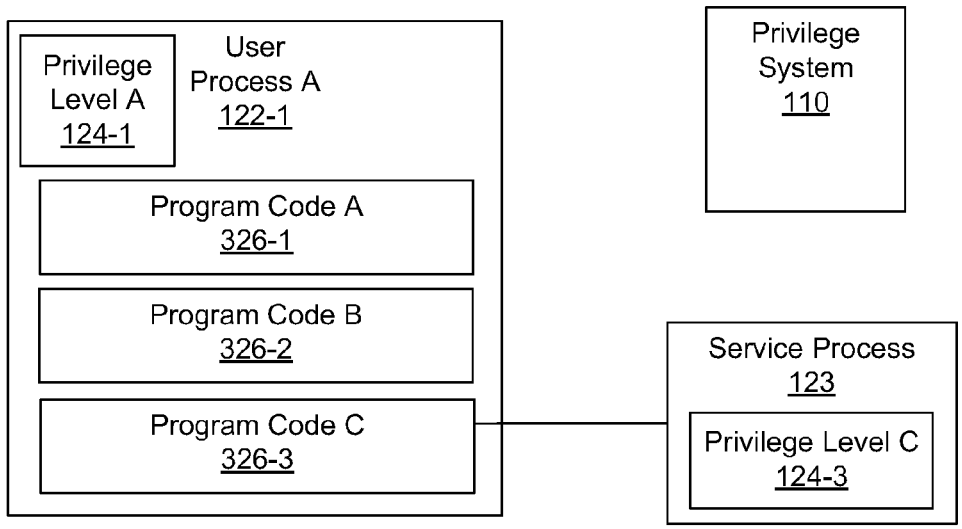
FIG. 3A is a diagram of a system for granting privileged access to computer code, according to one example of principles described herein.

FIG. 3A is a diagram of a system for granting privileged access to computer code, according to one example of principles described herein. As described above, user process A (122-1) is associated with privilege level A (124-1). User process A (122-1) is to access certain data that uses privilege level C (124-3). User process A (122-1) communicates with the service process (123) to access the data. The privilege system (110) is not contacted by user process A (122-1).

User process A (122-1) includes computer program code (326). The computer program code (326) is organized in sets of computer program code. Each set of computer program code (326) performs, when executed by a processor, a particular task. User process A (122-1) includes program code A (326-1), program code B (326-2), and program code C (326-3). Program code C (326-3) includes computer program code to, when executed by a processor, communicate with a service process (123) that uses the service address space. Program code C (326-3) includes computer program code to, when executed by a processor, request a data value associated with privilege level C (124-3). A service process (123) accesses data associated with privilege level C (124-3) and returns the value to program code C (326-3) associated with user process A (122-1).

Figure 3B:
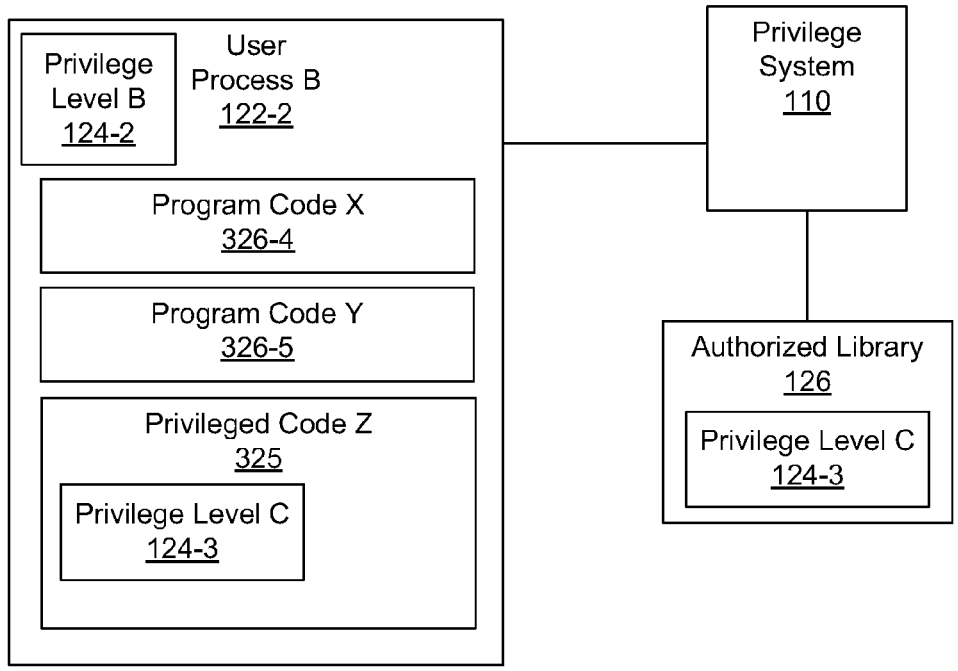
FIG. 3B is a diagram of a system for granting privileged access to computer code, according to one example of principles described herein.

FIG. 3B is a diagram of a system for granting privileged access to computer code, according to one example of principles described herein. As described above, an authorized library (126) is associated with privilege level C (124-3). The authorized library (126) uses the privilege system (110) to allow user process B (122-1) to access certain data associated with service level C (124-3). User process B (122-1) is associated with privilege level B (124-2). User process B (122-2) is to access certain data that uses privilege level C (124-3).

User process B (122-2) includes computer program code (325, 326). The computer program code (325, 326) is organized in sets of computer program code. Each set of computer program code (325, 326) performs, when executed by a processor, a particular task. User process B (122-2) includes program code X (326-4) and program code B (326-5).

The privilege system (110) establishes privileged code Z (325) in memory associated with user process B (122-1). Privilege code Z (325), when executed by a processor, performs the privileged function (FIG. 1, 125). The privilege system (110) communicates to user process B (122-1) information related to invoking privilege code Z (325). Privileged code Z (325), when executed for user process B (122-2), preserves privilege level B (124-2), associated with privilege level B (124-2) by preserving the privileges associated with user process B (122-2). Privileged code Z (325) executes instructions associated with privilege level C (124-3) to access certain data associated with privilege level C (124-3). Privilege code Z (325) returns the processor control to user process B (122-2).

Figure 4:
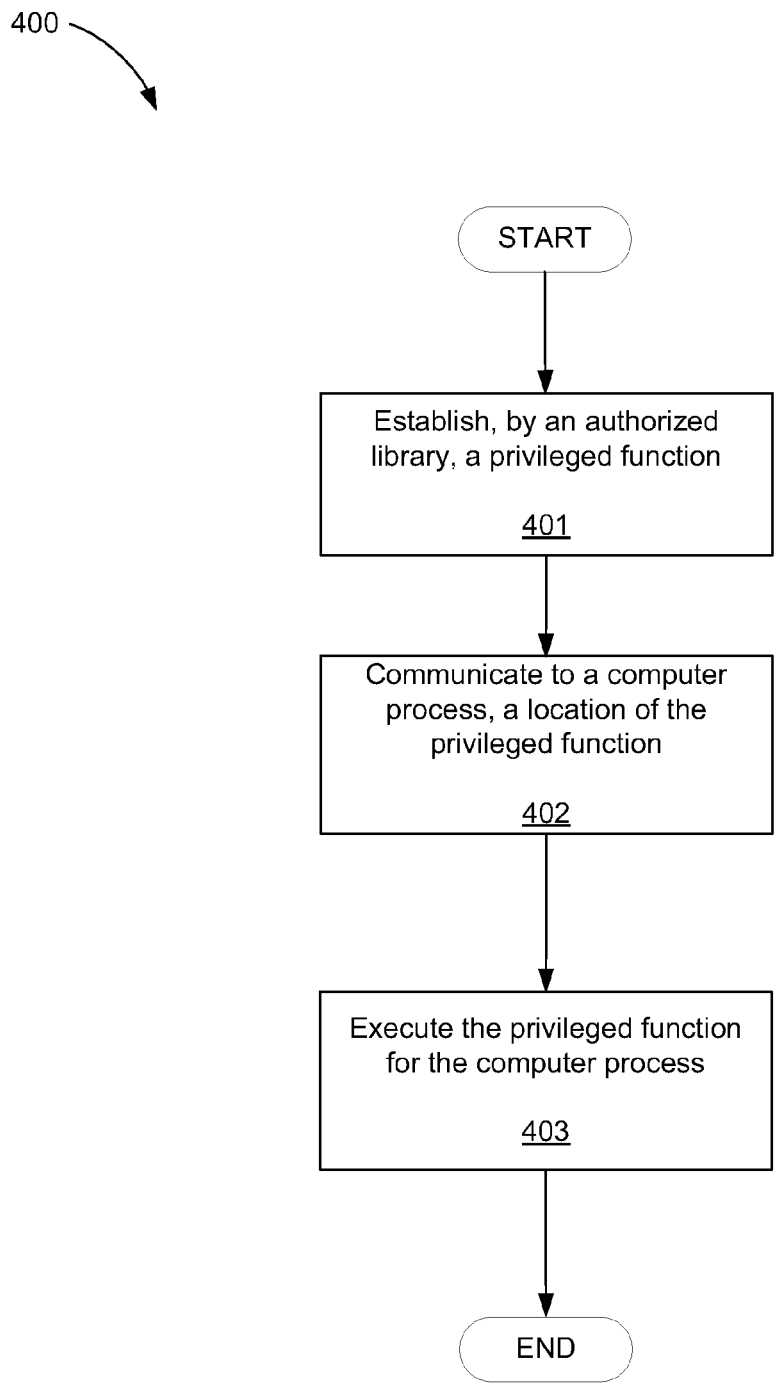
FIG. 4 is a flowchart of a method for executing privileged code in a process, according to one example of principles described herein.

FIG. 4 is a flowchart of a method for executing privileged code in a process, according to one example of principles described herein. The method (400) may be executed by a privilege system (110). The method (400) may be executed by other systems (i.e. system 300 or system 600).

The method (400) includes establishing (block 401), by an authorized library, a privileged function (FIG. 1, 125). The privileged function (FIG. 1, 125) has a first privilege level used by a processor (FIG. 2, 201) that is executing the privileged function, while preserving a different privilege level for a process invoking the privileged function. Establishing (block 401) the privileged function (FIG. 1, 125) may allocate a block of memory that stores the privileged function. The block of memory that stores the privileged function may be added to an address space associated with the computer process. The block of memory that stores the privileged function may be allocated as part of an address space associated with the computer process. The privilege level may be determined by a flag, the flag including a bit indicating when a process has an elevated privilege level. The flag may include a number of additional bits indicating access control within a privilege level.

The method (400) includes communicating (block 402), to a computer process, the access information of the privileged function (FIG. 1, 125), to allow the computer process to invoke the privileged function. The access information may be represented by a token. The token includes access information for the privileged function (FIG. 1, 125). The access information for the privileged function may include a program counter index and a program entry point. A token may be communicated to the computer process, to allow the computer process to determine the access information for the privileged function (FIG. 1, 125).

The method (400) includes executing (block 403) the privileged function for the computer process. Executing (block 403) the privileged function (FIG. 1, 125) includes setting a processor (FIG. 2, 201) that is being used by the computer process to use the first privilege level associated with the privileged function, executing the privileged function with that processor at the first privilege level, then restoring that processor to a previous privilege level, and returning control of that processor to the computer process. The privileged function (FIG. 1, 125) may execute a number of instructions associated with the first privilege level, to establish use of the first privilege level. The privileged function maintains the privileges associated with the computer process, leaving the privileges associated with the computer process undisturbed.

Figure 5:
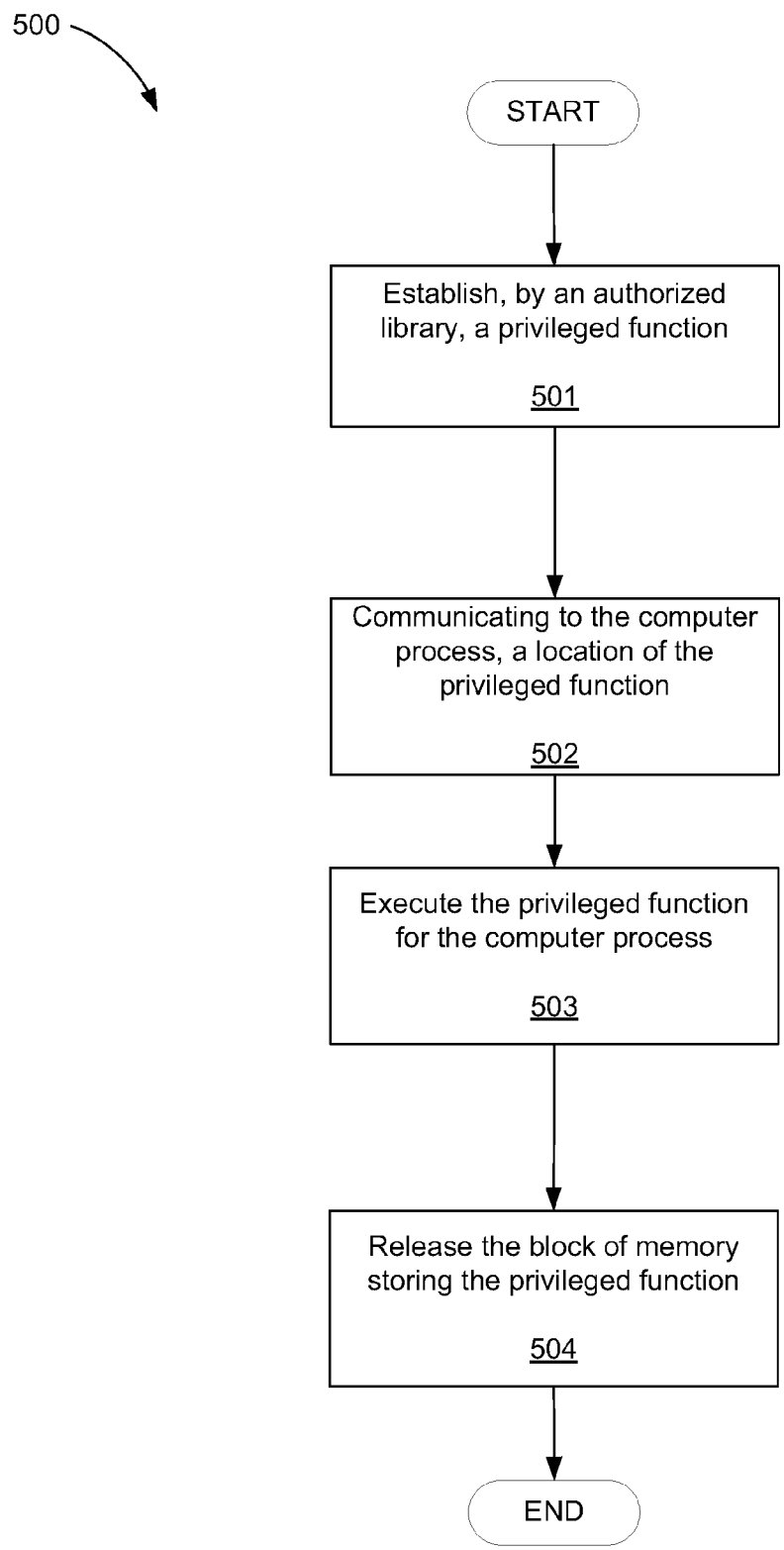
FIG. 5 is a flowchart of a method for executing privileged code in a process, according to another example of principles described herein.

FIG. 5 is a flowchart of a method for executing privileged code in a process, according to one example of the principles described herein. The method (500) may be executed by a privilege system (110). The method (500) may be executed by other systems (i.e. system 300 or system 600).

The method (500) includes establishing (block 501), by an authorized library, a privileged function (FIG. 1, 125). The privileged function (FIG. 1, 125) has a first privilege level used by a processor that is executing the privileged function, while preserving a different privilege level for a process invoking the privileged function.

The method (500) includes communicating (block 502), to a computer process, the access information of the privileged function (FIG. 1, 125), to allow the computer process to invoke the privileged function.

The method (500) includes executing (block 503) the privileged function (FIG. 1, 125) for the computer process. Executing (block 503) the privileged function (FIG. 1, 125) includes setting a processor that is being used by the computer process to use the first privilege level associated with the privileged function, executing the privileged function with that processor at the first privilege level, then restoring that processor to a previous privilege level, and returning control of that processor to the computer process that called the privileged function.

The method (500) includes releasing (block 504), as part of termination of the computer process, the block of memory that stores the privileged function (FIG. 1, 125). The releasing (block 504) may be performed by request when the computer process is terminated. The releasing (block 504) may be performed as part of the operating system cleanup when a process terminates.

Figure 6:
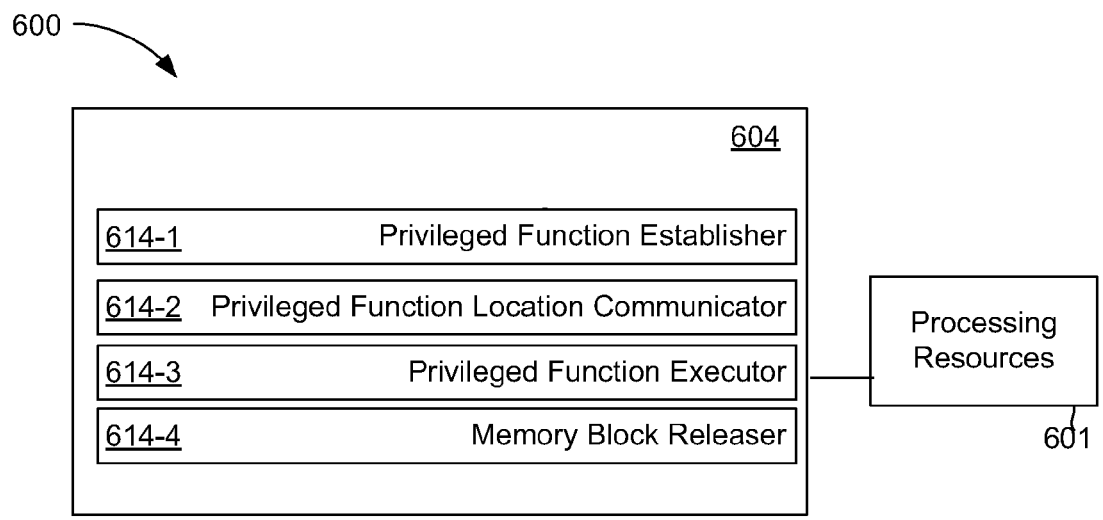
FIG. 6 is a diagram of a privilege system, according to one example of principles described herein.

FIG. 6 is a diagram of a privilege system, according to one example of principles described herein. The privilege system (600) includes processing resources (601) that are in communication with a storage medium (604). The processing resource (601) includes at least one processor and other resources used to process programmed instructions. The storage medium (604) generally represents any memory capable of storing data, such as programmed instructions or data structures to be used by the privilege system (600). The programmed instructions shown stored in the storage medium (604) include a privileged function establisher (614-1), a privileged function location communicator (614-2), a privileged function executor (614-3), and a memory block releaser (614-4).

The privileged function establisher (614-1) represents programmed instructions that, when executed, cause the processing resource (601) to establish, by an authorized library, a privileged function (FIG. 1, 125). The privileged function (FIG. 1, 125) has a first privilege level used by a processor that is executing the privileged function, while preserving a different privilege level for a process invoking the privileged function (FIG. 1, 125). The privileged function (FIG. 1, 125) maintains the current state of the privilege level associated with the process, while allowing the function to execute at the first privilege level.

The privileged function location communicator (614-2) represents programmed instructions that, when executed, cause the processing resource (601) to communicate, to a computer process, access information of the privileged function (FIG. 1, 125), to allow the computer process to invoke the privileged function. The privileged function location communicator (614-2) may use a token to communicate the location of the privileged function (FIG. 1, 125).

The privileged function executor (614-3) represents programmed instructions that, when executed, cause the processing resource (601) to execute the privileged function (FIG. 1, 125) for the computer process. The privileged function (FIG. 1, 125) sets a processor (FIG. 2, 201) that is being used by the computer process to use the first privilege level associated with the privileged function, executing the privileged function with that processor at the first privilege level, then restoring that processor to a previous privilege level, and returning control of that processor to the computer process that called the privileged function.

The memory block releaser (614-4) represents programmed instructions that, when executed, cause the processing resource (601) to release, as part of termination of the computer process, the block of memory that stores the privileged function (FIG. 1, 125). The memory block may be released by a computer operating system during a process exit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for executing privileged code in a process, the method comprising:
   when a computer operating system is creating a computer process in a user address space, establishing, by an authorized library, access to a privileged function in the user address space, the privileged function having a first privilege level used by a processor that is executing the privileged function, while preserving a different privilege level for a process invoking the privileged function;
   communicating, to the computer process, a location of the privileged function by passing a token to the computer process as part of creation of the computer process in the user address space, to allow the computer process to invoke the privileged function;
   using a system utility to identify a location of the privileged function based on the token to allow the computer process to invoke the privileged function; and
   executing the privileged function for the computer process, including setting a processor that is being used by the computer process to use the first privilege level associated with the privileged function, executing the privileged function with that processor at the first privilege level, then restoring that processor to a previous privilege level, and returning control of that processor to the computer process.

2. The method of claim 1, wherein establishing the privileged function includes allocating a block of memory that stores the privileged function, the block of memory being in a user address space along with the computer process.

3. The method of claim 2, wherein the privileged function that is added to the user address space associated with the computer process comprises an interface for accessing a privileged function of the authorized library.

4. The method of claim 2, further comprising releasing, as part of termination of the computer process, the block of memory that stores the privileged function.

5. The method of claim 1, wherein the token comprising access information for the privileged function.

6. The method of claim 5, wherein the access information for the privileged function comprises a program counter index and a program entry point.

7. The method of claim 1, wherein privilege level is determined by a flag, the flag including a bit indicating when a process has elevated privileges.

8. The method of claim 7, wherein the flag further comprises a number of additional bits indicating access control within a privilege level.

9. A system for granting privileged access to computer code, the system comprising:
a hardware processor;
a memory device communicatively coupled to the processor; and
a privilege system, the privilege system comprising:
an establish engine to, when a computer operating system is creating a computer process in a user address space, establish, by an authorized library, access to a privileged function in the user address space associated with the computer process, the privileged function having a first privilege level used by a processor that executes the privileged function while preserving a different privilege level for a process invoking the privileged function;
the establish engine also to communicate, to the computer process, a location of the privileged function by passing a token to the computer process as part of creation of the computer process in the user address space, to allow the computer process to invoke the privileged function, and to use a system utility to identify a location of the privileged function based on the token to allow the computer process to invoke the privileged function; and
an execute engine to execute the privileged function for the computer process, including setting a processor controlled by the computer process to use the first privilege level associated with the privileged function, executing the privileged function with that processor at the first privilege level, restoring that processor to a previous privilege level, and returning control of that processor to the computer process.

10. The system of claim 9, further comprising a release engine to release, as part of termination of the computer process, a block of memory in the user address space that contains the privileged function.

11. The system of claim 9, further comprising a communicate engine to communicate, to the computer process, a location of the block of memory storing the privileged function so as to allow the computer process to invoke the privileged function.

12. The system of claim 11, wherein the token comprises access information for the privileged function.

13. The system of claim 9, wherein the establish engine allocates a block of memory that stores the privileged function within the user address space associated with the computer process.

14. The system of claim 9, wherein a location for the privileged function comprises a program counter index and a program entry point.

15. The system of claim 9, wherein a privilege level is set using a flag, the flag comprising a bit indicating whether a process has elevated privileges.

16. The system of claim 9, wherein use of access information for the privileged function by the computer process is verified as allowed before executing privileged instructions.

17. A computer program product for granting privileged access to computer code, the computer program product comprising:
a non-transitory computer readable storage medium, said computer readable storage medium comprising computer readable program code embodied therewith, said computer readable program code comprising program instructions that, when executed, cause a processor to:
when a computer operating system is creating a computer process in a user address space, establish, by an authorized library, access to a privileged function in the user address space, the privileged function having a first privilege level used while executing the privileged function while preserving a different privilege level for a process invoking the privileged function;
communicate, to the computer process, a location of the privileged function by passing a token to the computer process as part of creation of the computer process in the user address space;
use a system utility to identify a location of the privileged function based on the token to allow the computer process to invoke the privileged function; and
execute the privileged function, for the computer process, including setting a processor that is being used by the computer process to use the first privilege level, executing the privileged function with that processor at the first privilege level, restoring that processor to a previous privilege level, and returning control of that processor to the computer process.

18. The product of claim 17, wherein a block of memory that stores the privileged function is allocated in the user address space associated with the computer process.

19. The product of claim 17, wherein the system utility comprises a PC-Non-Switch LX/EX routine to locate the privileged function.

* * * * *